(12) United States Patent
Fujita et al.

(10) Patent No.: US 6,699,944 B1
(45) Date of Patent: Mar. 2, 2004

(54) ACRYLIC RUBBER COMPOSITION

(75) Inventors: Masayuki Fujita, Kobe (JP); Yoshiki Nakagawa, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/830,678

(22) PCT Filed: Oct. 28, 1999

(86) PCT No.: PCT/JP99/05952

§ 371 (c)(1),
(2), (4) Date: Jul. 30, 2001

(87) PCT Pub. No.: WO00/24824

PCT Pub. Date: May 4, 2000

(30) Foreign Application Priority Data

Oct. 28, 1998 (JP) ............................................. 10-306231

(51) Int. Cl.[7] ............................ C08L 33/00; C08L 33/08
(52) U.S. Cl. ..................... 525/330.5; 525/381; 525/382; 525/374; 525/209; 525/228
(58) Field of Search ............................... 525/330.5, 381, 525/382, 374, 209, 228

(56) References Cited

U.S. PATENT DOCUMENTS

| | | |
|---|---|---|
| 5,527,870 A | 6/1996 | Maeda et al. |
| 5,852,129 A | 12/1998 | Kusakabe et al. |
| 6,268,433 B1 * | 7/2001 | Barkac et al. ............ 525/92 F |
| 6,319,967 B1 * | 11/2001 | Coca et al. ................. 523/436 |
| 2002/0086942 A1 * | 7/2002 | Fujita et al. ................ 525/100 |

FOREIGN PATENT DOCUMENTS

| | | |
|---|---|---|
| EP | 0789036 A2 | 8/1997 |
| JP | 53-115769 | 10/1978 |
| JP | 5-43614 | 2/1993 |

* cited by examiner

*Primary Examiner*—Donald R. Wilson
(74) *Attorney, Agent, or Firm*—Connolly Bove Lodge & Hutz LLP

(57) ABSTRACT

An acrylic rubber composition providing crosslinked products of good handleability and good characteristics is provided. The acrylic rubber composition comprises the following two components: (A) an acrylic polymer having at least one active halogen represented by the formula (1) at a main terminus:

$$-CH_2-C(R^1)(R^2)(X) \qquad (1)$$

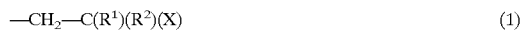

wherein $R^1$ and $R^2$ are the same or different and each represents a hydrogen atom or univalent organic group derived from a group bonded to a vinyl group of a main chain-constituting vinyl monomer and X represents chlorine, bromine or iodine; and (B) a crosslinking agent.

19 Claims, No Drawings

ACRYLIC RUBBER COMPOSITION

TECHNICAL FIELD

The present invention relates to an acrylic rubber composition. More particularly, it relates to an acrylic rubber composition comprising an acrylic polymer having an active halogen serving as a crosslinking group and a crosslinking agent.

BACKGROUND ART

Halogen-containing acrylic rubbers are synthesized by copolymerization of an alkyl acrylate and/or an alkoxyalkyl acrylate as the main component and an active halogen-containing monomer as a crosslinking component. And, the crosslinking products are used as rubbers showing good oil resistance, heat resistance, weathering resistance, ozone resistance and permanent compression set, hence as sealing materials, inclusive of packings and gaskets, and as various molded products.

The conventional halogen-containing acrylic rubbers are produced by the so-called free radical polymerization, such as bulk polymerization, solution polymerization, emulsion polymerization, suspension polymerization, bulk-suspension polymerization, using a polymerization initiator. Since they are produced by the free radical polymerization method, an active halogen-containing monomer to serve as a crosslinking site is introduced into the molecular chain substantially at random and, therefore, for obtaining low-modulus, high-elongation rubbers while securing crosslinking sites, one cannot but increase the molecular weight. Thus, in incorporating various compounding additives in acrylic rubbers showing a high viscosity because of their high molecular weight, the compounding must be carried out using an open roll or kneader and spending time and energy. Accordingly, they cannot be said to be easy to handle. In the current state of art, it is very difficult to decrease the molecular weight to thereby reduce the viscosity and improve the handleability.

In the above situation, the present inventors found that an acrylic rubber composition showing good handleability can be obtained by crosslinking an acrylic polymer having an active halogen represented by the following general formula (1) at a main chain terminus using a crosslinking agent. Based on this finding, they have now completed the present invention.

SUMMARY OF THE INVENTION

Thus, the invention is related to an acrylic rubber composition which comprises the following two components:

(A) an acrylic polymer having at least one active halogen represented by the general formula (1) at a main chain terminus:

wherein $R^1$ and $R^2$ are the same or different and each represents a hydrogen atom or univalent organic group derived from a group bonded to a vinyl group of a main chain-constituting vinyl monomer and X represents chlorine, bromine or iodine; and (B) a crosslinking agent.

DETAILED DISCLOSURE OF THE INVENTION

In the following, the acrylic rubber composition of the present invention is described in detail.

[Re: (A) Component Acrylic Polymer]

The acrylic polymer having at least one active halogen represented by the general formula (1) at a main chain terminus according to the present invention is obtained by (co)polymerizing at least one vinyl monomer such as an alkyl acrylate and/or an alkoxyalkyl acrylate, preferably by atom transfer radical polymerization.

(In the formula, $R^1$ and $R^2$ are the same or different and each represents a hydrogen atom or univalent organic group derived from a group bonded to a vinyl group of a main chain-constituting vinyl monomer and X represents chlorine, bromine or iodine.)

The above-mentioned acrylic polymer having at least one active halogen represented by the general formula (1) at a main chain terminus reacts with the (B) component crosslinking agent to be thereby crosslinked and give a rubber-like cured product. When the number of the active halogen represented by the general formula (1) occurring in one molecule is less than 1 on an average, any satisfactory curing product can be obtained. For obtaining satisfactory curing products, the polymer should preferably have, on an average, 1.1 to 4, more preferably 1.2 to 2, active halogens represented by the general formula (1).

The (A) component acrylic polymer may be a homopolymer or a copolymer. When it is a homopolymer, it is obtained by using one kind selected from among alkyl acrylates and alkoxyalkyl acrylates. When it is a copolymer, it is obtained by copolymerizing two or more kinds selected from among alkyl acrylates and alkoxyalkyl acrylates or by copolymerizing one or more kinds selected from among alkyl acrylates and alkoxyalkyl acrylates with a monomer or monomers other than those.

In the present invention, the main chain-constituting vinyl monomer includes radical-polymerizable monomers having an ethylenically unsaturated bond, inclusive of alkyl acrylates, alkoxyalkyl acrylates and other monomers.

As the alkyl acrylate in the practice of the invention, there may be mentioned methyl acrylate, ethyl acrylate, n-propyl acrylate, isopropyl acrylate, n-butyl acrylate, isobutyl acrylate, tert-butyl acrylate, n-pentyl acrylate, n-hexyl acrylate, cyclohexyl acrylate, n-heptyl acrylate, n-octyl acrylate, 2-ethylhexyl acrylate, nonyl acrylate, decyl acrylate, dodecyl acrylate, stearyl acrylate and the like and, among them, ethyl acrylate and n-butyl acrylate are particularly preferred. These alkyl acrylates may be used singly or two or more of them may be used in combination.

As the alkoxyalkyl acrylate, there may be mentioned, for example, methoxymethyl acrylate, ethoxymethyl acrylate, 2-methoxyethyl acrylate, 2-ethoxyethyl acrylate, 2-propoxyethyl acrylate, 2-butoxyethyl acrylate, 3-methoxypropyl acrylate, 4-methoxybutyl (meth)acrylate and the like. In particular, 2-methoxyethyl acrylate and 2-ethoxyethyl acrylate are preferred. These alkoxyalkyl acrylates may be used singly or two or more of them may be used in combination.

Further, as the vinyl monomer (hereinafter referred to as "other monomer") other than such alkyl acrylate or alkoxyalkyl acrylate, there may be mentioned esters of halogen-containing saturated carboxylic acids with unsaturated alcohols, such as vinyl chloroacetate and allyl chloroacetate; haloalkyl (meth)acrylates such as chloromethyl (meth)acrylate and 2-chloroethyl (meth)acrylate; halogen-containing unsaturated ethers such as chloromethyl vinyl ether and 3-chloropropyl allyl ether; halogen-containing unsaturated ketones such as 2-chloroethyl vinyl ketone and 3-chloropropyl vinyl ketone; haloacyloxyalkyl (meth) acrylates such as 2-(chloroacetoxy)ethyl (meth)acrylate and 3-(chloroacetoxy)propyl (meth)acrylate; halomethyl-containing aromatic vinyl compounds such as p-chloromethylstyrene and p-chloromethyl-α-methylstyrene; other vinyl monomers having an active halogen capable of participating in crosslinking reactions; alkyl methacrylates such as methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, cyclohexylmethacrylate, n-heptylmethacrylate, n-octyl methacrylate, 2-ethylhexyl methacrylate, nonyl methacrylate, decyl methacrylate, dodecyl methacrylate and stearyl methacrylate; (meth)acrylic monomers other than the alkyl acrylates, alkoxyalkyl acrylates and alkyl methacrylates, for example phenyl (meth) acrylate, toluyl (meth)acrylate, benzyl (meth)acrylate, 2-hydroxyethyl (meth)acrylate, 2-hydroxypropyl (meth) acrylate, glycidyl (meth)acrylate, 2-aminoethyl (meth) acrylate, γ-(methacryloyloxy)propyltrimethoxysilane, (meth)acrylic acid-ethylene oxide adducts, trifluoromethylmethyl (meth)acrylate, 2-trifluoromethylethyl (meth) acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth) acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate and (meth)acrylic acid; styrenic monomers such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cylcohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate and vinyl cinnamate and like vinyl esters; alkenes such as ethylene and propylene; conjugated dienes such as butadiene and isoprene; vinyl chloride, vinylidene chloride, allyl chloride and allyl alcohol, among others. These may be used singly or two or more of them may be used in combination.

In cases where the above-mentioned (A) component acrylic polymer is prepared by copolymerizing an alkyl acrylate and/or an alkoxyalkyl acrylate with another or other monomers, the content of alkyl acrylate and alkoxyalkyl acrylate in the monomer mixture is generally 50 to 100%, preferably 70 to 100%. The content of other monomers is generally 0 to 50%. When an active halogen-containing vinyl monomer(s) is (are) used, the content thereof is generally 0 to 10%.

The number average molecular weight of the above acrylic polymer (A) having at least one active halogen at a main chain terminus is not particularly restricted but preferably is within the range of 1,000 to 500,000. When the molecular weight is less than 1,000, the characteristics intrinsic in acrylic polymers can hardly be manifested. When it is more than 500,000, the handling becomes difficult.

The molecular weight distribution, namely the ratio (Mw/Mn) between weight average molecular weight (Mw) and number average molecular weight (Mn), of the above acrylic polymer (A) having at least one active halogen at a main chain terminus is not particularly restricted. For suppressing the viscosity of the rubber composition prior to crosslinking to thereby facilitate the handling thereof and for obtaining satisfactory cured product physical properties, it is preferred that the molecular weight distribution is narrow. Thus, the molecular weight distribution value is preferably less than 1.8, more preferably not more than 1.7, still more preferably not more than 1.6, yet more preferably not more than 1.5, particularly preferably not more than 1.4, most preferably not more than 1.3. The molecular weight distribution is measured most generally by gel permeation chromatography (GPC). The number average molecular weight and like values can be determined on the polystyrene equivalent basis, for instance, using chloroform or THF as the mobile phase and a polystyrene gel column as the column.

The "atom transfer radical polymerization technique" is a technique of polymerizing vinyl monomers using an organohalogen or sulfonyl halide compound as the initiator and a transition metal complex as the catalyst and, in spite of its being a mode of that radical polymerization which is regarded as difficult to control because of the high rate of polymerization and the tendency toward occurrence of termination reactions such as radical-to-radical coupling, it hardly undergoes such termination reactions and can give polymers with a narrow molecular weight distribution (a Mw/Mn ratio of about 1.1 to 1.5). It is possible to arbitrarily control the molecular weight by adjusting the monomer/initiator charge ratio. Further, the polymerization terminus has an active halogen represented by the general formula (1).

This atom transfer radical polymerization technique is described, for example, by Matyjaszewski et al. in the Journal of the American Chemical Society, 1995, vol. 117, pages 5614 ff.; Macromolecules, 1995, vol. 28, pages 7901 ff.; Science, 1996, vol. 272, pages 866 ff.; WO 96/30421, WO 97/18247, WO 98/01480 and WO 98/40415, and by Sawamoto et al. in Macromolecules, 1995, vol. 28, pages 1721 ff, among others.

As the initiator in the above "atom transfer radical polymerization technique", there may be mentioned organohalogen compounds, in particular organohalogen compounds having a highly reactive carbon-halogen bond(s) or sulfonyl halide compounds. As the above organohalogen compounds having a highly reactive carbon-halogen bond(s), there may be mentioned carbonyl compounds having a halogen at the α position and compounds having a halogen at the benzyl position). These may be used singly or two or more of them may be used in combination.

The transition metal complex to be used as the catalyst in the above "atom transfer radical polymerization technique" is not particularly restricted but includes, among others, complexes containing an element of the group 7, 8, 9, 10 or 11 of the periodic table as the central atom. Preferred are one or more selected from the group consisting of complexes of copper having a valence of zero, univalent copper, bivalent ruthenium, bivalent iron and bivalent nickel. In particular, copper complexes are preferred among others. Such transition metal complexes may be used singly or two or more of them may be used in combination.

The above univalent copper compound is not particularly restricted but includes, for example, cuprous chloride, cuprous bromide, cuprous iodide, cuprous cyanide, cuprous oxide and cuprous perchlorate. When a copper compound is used, ligands such as 2,2'-bipyridiyl and derivatives thereof, 1,10-phenanthroline and derivatives thereof, and polyamines such as tetramethylethylenediamine, pentamethyldiethylenetriamine and hexamethyltris (2-aminoethyl) amine may be added to increase the catalytic activity.

The tristriphenylphosphine complex of bivalent ruthenium chloride ($RuCl_2(PPh_3)_3$) is also suited for use as the catalyst. When a ruthenium compound is used as the catalyst, an aluminum alkoxide may be added as an activator. Further, a bistriphenylphosphine complex of bivalent iron ($FeCl_2(PPh_3)_2$) a bistriphenylphosphine complex of bivalent nickel ($NiCl_2(PPh_3)_2$) and a bistributylphosphine complex of bivalent nickel ($NiBr_2(PBu_3)_2$) are also suited as the catalysts.

The above polymerization reaction may be carried out in the absence of a solvent or in various solvents. The solvents are not particularly restricted but mention may be made of, for example, hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; and carbonate solvents such as ethylene carbonate and propylene carbonate. These may be used singly or two or more of them may be used in combination.

The above "atom transfer radical polymerization technique" may be carried out in the temperature range of 0° C. to 200° C., preferably room temperature to 150° C.

For obtaining an acrylic polymer having at least one such active halogen as mentioned above at a molecular chain terminus using the "atom transfer radical polymerization technique", an organohalogen or sulfonyl halide compound having two or more initiation sites is preferably used. The organohalogen or sulfonyl halide compound having two or more initiation sites is not particularly restricted but includes, among others, the compounds listed below.

Thus, as specific examples thereof, there may be mentioned:

o-, m-, p-$XCH_2$—$C_6H_4$—$CH_2X$, o-, m-, p-$CH_3C(H)(X)$—$C_6H_4$—$C(H)(X)CH_3$—, o-, m-, p- $(CH_3)_2C(X)$—$C_6H_4$—$C(X)(CH_3)_2$ (in the above formulas, $C_6H_4$ represents a phenylene group and X represents chlorine, bromine or iodine);

$RO_2C$—$C(H)(X)$—$(CH_2)_n$—$C(H)(X)$—$CO_2R$, $RO_2C$—$C(CH_3)(X)$—$(CH_2)_n$—$C(CH_3)(X)$—$CO_2R$, $RC(O)$—$C(H)(X)$—$(CH_2)_n$—$C(H)(X)$—$C(O)R$, $RC(O)$—$C(CH_3)(X)$—$(CH_2)_n$—$C(CH_3)(X)$—$C(O)R$ (in the above formulas, R represents a $C_{1-20}$alkyl, aryl or aralkyl group, n represents an integer of 0 to 20 and X represents chlorine, bromine or iodine);

$XCH_2$—$C(O)$—$CH_2X$, $H_3C$—$C(H)(X)$—$C(O)$—$C(H)(X)$—$CH_3$, $(H_3C)_2C(X)$—$C(O)$—$C(X)(CH_3)_2$, $C_6H_5C(H)(X)$—$(CH_2)_n$—$C(H)(X)C_6H_5$ (in the above formulas, X represents chlorine, bromine or iodine, and n represents an integer of 0 to 20);

$XCH_2CO_2$—$(CH_2)_n$—$OCOCH_2X$, $CH_3C(H)(X)CO_2$—$(CH_2)_n$—$OCOC(H)(X)CH_3$, $(CH_3)_2C(X)CO_2$—$(CH_2)_n$—$OCOC(X)(CH_3)_2$ (in the above formulas, n represents an integer of 1 to 20) ;

$XCH_2C(O)C(O)CH_2X$, $CH_3C(H)(X)C(O)C(O)C(H)(X)CH_3$, $(CH_3)_2C(X)C(O)C(O)C(X)(CH_3)_2$, -o, m-, p-$XCH_2CO_2$—$C_6H_4$—$OCOCH_2X$, o-, m-, p-$CH_3C(H)(X)CO_2$—$C_6H_4$—$OCOC(H)(X)CH_3$, o-, m-, p-$(CH_3)_2C(X)CO_2$—$C_6H_4$—$OCOC(X)(CH_3)_2$, o-, m-, p-$XSO_2$—$C_6H_4$—$SO_2X$ (in the above formulas, X represents chlorine, bromine or iodine).

These may be used singly or two or more of them may be used in combination.

[Re: (B) Component Crosslinking Agent]

The (B) component crosslinking agent (also referred to as "vulcanizing agent") to be used according to the invention reacts with the active halogen of the acrylic polymer having at least one active halogen, which is a crosslinking group, at a main chain terminus thereof and thereby couples a molecule of the above acrylic polymer to another and includes those crosslinking agents generally used for halogen-containing acrylic rubbers.

Such crosslinking agents include, but are not limited to, aliphatic polyamines such as ethylenediamine monohydrate, Trymeen base, diethylenetriamine, triethylenetetramine, tetraethylenepentamine and hexamethylenediamine; carbamates derived from the aliphatic polyamines mentioned above, such as hexamethylenediamine carbamate; fatty acid metal salts such as sodium laurate, potassium laurate, sodium stearate and potassium stearate; organic carboxylic acid ammonium salts such as ammonium benzoate, and the like. Among them, aliphatic polyamines and aliphatic polyamine carbamates are preferred.

The addition amount of the (B) component crosslinking agent is generally 0.01 to 10 parts by weight, preferably 0.05 to 5 parts by weight, per 100 parts by weight of the (A) component acrylic polymer. When it is less than 0.01 part by weight, the rate of crosslinking and/or the degree of crosslinking may lower. At an amount exceeding 10 parts by weight, the density of crosslinks may become excessively high.

Those vulcanization accelerators generally used in halogen-containing acrylic rubbers may be incorporated together with those crosslinking agents. Such vulcanization accelerators include, but are not limited to, dibasic phosphate salts such as dibasic lead phosphate; thioureas such as diethylthiourea and diphenylthiourea; thiuram sulfides such as dipentamethylenethiuram tetrasulfide, tetramethylthiuram disulfide and tetrabutylthiuram disulfide; dithiocarbamate salts such as zinc dimethyldithiocarbamate, zinc dibutyldithiocarbamate and copper dimethyldithiocarbamate; sulfur and the like.

The combination of the above crosslinking agent and vulcanization accelerator is not particularly restricted but preferably is the combination of ① an aliphatic polyamine carbamate and a dibasic phosphate, ② a fatty acid metal salt and a thiuram sulfide or ③ a fatty acid metal salt and sulfur.

The acrylic rubber composition of the invention may be a composition comprising the acrylic polymer (A) and the crosslinking agent (B) alone, especially when the acrylic polymer (A) has a plurality of active halogens at main chain termini. It may also be a composition further comprising a conventional halogen-containing acrylic rubber obtained by subjecting an active halogen-containing monomer to copolymerizion. On that occasion, the addition amount thereof is not particularly restricted but, generally, 0.1 to 10,000 parts by weight, preferably 1 to 5,000 parts by weight, more preferably 10 to 1,000 parts by weight, of the conventional halogen-containing acrylic rubber is used per 100 parts by weight of the acrylic polymer (A).

In the acrylic rubber composition of the invention, there may be incorporated, for the purpose of modifying various physical properties of the rubber composition or curing product, fillers, plasticizers, antioxidants, ultraviolet absorbers, light stabilizers, scorch retarders, crosslinking retarders, processing aids, lubricants, tackifiers, lubricating agents, flame retardants, antisagging agents, fungicides, antistatic agents, colorants, adhesion promoters, weathering resistance improvers, mechanical property modifiers and so on. Further, another or other rubbers, elastomers and/or resins may also be incorporated unless the characteristics of the acrylic rubber composition are impaired.

The fillers are not particularly restricted but include, among others, reinforcing fillers such as fumed silica, precipitated silica, silicic anhydride, hydrous silicic acid and carbon black; filler such as calcium carbonate, magnesium carbonate, diatomaceous earth, calcined clay, clay, talc, titanium oxide, bentonite, organic bentonite, ferric oxide, zinc oxide, activated zinc white and shirasu balloons; and fibrous fillers such as asbestos, glass fiber and glass filaments. For obtaining high strength curing products using these fillers, fillers mainly selected from among fumed silica, precipitated silica, silicic anhydride, hydrous silicic acid, carbon black, surface-modified fine calcium carbonate, calcined clay, clay, activated zinc white and the like may be added. For obtaining low-strength, high-elongation curing products, fillers mainly selected from among titanium oxide, calcium carbonate, talc, ferric oxide, zinc oxide, shirasu balloons and the like may be added. These may be used singly or two or more of them may be used in combination.

Other rubbers or elastomers include, but are not limited to, olefinic elastomers, styrenic elastomers, vinyl chloride elastomers, polyester elastomers, polyamide elastomers, polyurethane elastomers, polysiloxane elastomers, fluorine type elastomers, natural rubbers, polybutadiene rubbers, polyisoprene rubbers, styrene-butadiene rubbers, acrylonitrile-butadiene rubbers and chloroprene rubbers. These may be used singly or two or more of them may be used in combination.

As for the conditions to be used in curing the acrylic rubber composition of the invention, the heating temperature is generally not lower than 150° C., preferably 150 to 200° C. The method of heating is not particularly restricted but the methods comprising press heating, steam heating, oven heating, hot air heating or the like can be used. Postcuring may be effected by post-heating.

The acrylic resin composition of the invention is useful in a wide range of fields such as automobiles and other transport machines, equipment and apparatus for general use, equipment, electric and electronic fields and architecture, for example as O-rings, oil seals, bearing seals, other seal materials, shock absorbers, protective materials, electric wire coverings, belts for industrial use, hoses and sheets.

BEST MODES FOR CARRYING OUT THE INVENTION

The following examples illustrate the present invention. They are, however, by no means limitative of the scope of the invention.

In the examples and comparative examples, "part(s)" and "%" mean "part(s) by weight" and "% by weight", respectively.

In the following examples, the "number average molecular weight" and "molecular weight distribution (ratio of weight average molecular weight to number average molecular weight)" were calculated by the standard polystyrene equivalent method using gel permeation chromatography (GPC). The GPC column used was one packed with a crosslinked polystyrene gel and the GPC solvent used was chloroform.

PRODUCTION EXAMPLE 1

Example of Synthesis of Poly(acrylate Ester) Having Bromine Groups at Both Termini A 10-L separable flask equipped with a condenser and stirrer was charged with CuBr (36.0 g, 0.251 mol) and the reaction vessel purged with nitrogen. Acetonitrile (618 mL) was added, and the contents were stirred on an oil bath at 70° C. for 15 minutes. The reaction was then started by adding thereto butyl acrylate (0.322 kg, 2.51 mol), ethyl acrylate (0.463 kg, 4.62 mol), 2-methoxyethyl acrylate (0.379 kg, 2.91 mol), diethyl 2,5-dibromoadipate (151 g, 0.419 mol) and pentamethyldiethylenetriamine (2.18 mL, 1.81 g, 0.0105 mol) (hereinafter referred to as "triamine" for short). While heating at 70° C. with stirring, butyl acrylate (1.29 kg, 10.0 mol), ethyl acrylate (1.85 kg, 18.5 mol) and 2-methoxyethyl acrylate (1.52 kg, 11.7 mol) were added dropwise continuously over 210 minutes. During the addition of monomers, the triamine (7.63 mL, 6.35 g, 0.0366 mol) was added. After the lapse of 270 minutes from the start of the reaction, the reaction was completed. The reaction mixture was diluted with toluene, and the polymerization catalyst was removed by passing the dilution through an activated alumina column. The toluene was then distilled off to give poly(butyl acrylate) having bromine groups at both termini (polymer [1]).

The polymer obtained had a number average molecular weight of 18,185, with a molecular weight distribution of 1.13.

EXAMPLE 1

A commercial active chlorine vulcanization type acrylic rubber (unvulcanized; number average molecular weight 290,000, molecular weight distribution 3.3, chlorine content 0.36%)(100 parts) and 30 parts of the polymer obtained in Production Example 1 were dissolved in toluene (500 mL) and the toluene was distilled off, whereby a uniform resin was obtained.

The resin obtained (100 parts), 1.0 part of sodium stearate and 0.6 part of sulfur were thoroughly mixed up in a kneader. The resin viscosity was lower as compared with Comparative Example 1. Using a press molding machine, primary vulcanization was performed at 170° C. for 30 minutes. Further 2 hours of heating at 180° C. for effecting secondary vulcanization gave a sheet-like curing product having rubber elasticity. This showed higher elongation as compared with the curing product obtained in Comparative Example 1.

COMPARATIVE EXAMPLE 1

The same commercial active chlorine vulcanization type acrylic rubber as used in Example 1 (100 parts), 1.0 part of sodium stearate and 0.6 part of sulfur were thoroughly mixed up in a kneader. Using a press molding machine, primary vulcanization was performed at 170° C. for 30 minutes. Further 2 hours of heating at 180° C. for effecting secondary vulcanization gave a sheet-like curing product having rubber elasticity.

EXAMPLE 2

The same commercial active chlorine vulcanization type acrylic rubber as used in Example 1 (100 parts) and 30 parts of the polymer obtained in Production Example 1 were heated to 150° C. and kneaded together in a kneader. 100 parts of the resin obtained by the above kneading was kneaded with 1 part of triethylenetetramine at room temperature, whereby a composition was obtained.

The composition was press-molded at 180° C. for 10 minutes and further heated at 180° C. for 1 hour to give a sheet-like curing product. No. 2 (⅓) dumbbell test specimens were prepared from the sheet-like curing product by punching and subjected to tensile testing using a Shimadzu autograph (measuring conditions: 23° C., 200 mm/min).

The breaking strength was 1.6 MPa and the breaking elongation was 82%. As compared with Comparative Example 2, the workability was improved and a uniform sheet was obtained. The strength of the curing product was higher.

COMPARATIVE EXAMPLE 2

The same commercial active chlorine vulcanization type acrylic rubber as used in Example 1 (100 parts) and 1.0 part of triethylenetetramine were mixed up in a kneader. The composition thus obtained was press-molded at 180° C. for 10 minutes, followed by 1 hour of further heating at 180° C. Curing occurred while the melting was insufficient. No. 2 (⅓) dumbbell test specimens were prepared from the sheet-like curing product obtained by punching and subjected to tensile testing using a Shimadzu autograph (measuring conditions: 23° C., 200 mm/min).

The breaking strength was 1.1 MPa and the breaking elongation was 92%.

INDUSTRIAL APPLICABILITY

The acrylic rubber composition of the invention, which has the above constitution, is good in handleability and can give crosslinked products having good characteristics.

What is claimed is:

1. An acrylic rubber composition which comprises the following two components:

(A) an acrylic polymer having at least on average 1.1 active halogen represented by the general formula (1) at a main chain terminus:

wherein $R^1$ represents a hydrogen atom, and $R^2$ represents a univalent organic group derived from a group bonded to a vinyl group of a main chain-constituting vinyl monomer and X represents chlorine, bromine or iodine; and (B) a crosslinking agent;
      wherein the (B) component crosslinking agent reacts with the active halogen of the (A) component acrylic polymer to thereby couple a molecule of the (A) component acrylic polymer to another molecule thereof; and
      the (B) component crosslinking agent is present in an amount of 0.01 to 10 parts by weight per 100 parts by weight of the (A) component acrylic polymer.

2. The acrylic rubber composition according to claim 1, wherein the (A) component acrylic polymer shows a molecular weight distribution of less than 1.8.

3. The acrylic rubber composition according to claim 1 or 2, wherein the production method of the (A) component acrylic polymer is the atom transfer radical polymerization technique.

4. The acrylic rubber composition according to claim 3, wherein a catalyst for the atom transfer radical polymerization technique is a complex of a metal selected from the group consisting of copper, nickel, ruthenium and iron.

5. The acrylic rubber composition according to claim 4, wherein the catalyst for atom transfer radical polymerization technique is a copper complex.

6. The acrylic rubber composition according to claim 1, wherein the (B) component crosslinking agent is an aliphatic polyamine.

7. The acrylic rubber composition according to claim 1, wherein the (B) component crosslinking agent is an aliphatic polyamine carbamate.

8. The acrylic rubber composition according to claim 2, wherein the (B) component crosslinking agent is an aliphatic polyamine.

9. The acrylic rubber composition according to claim 3, wherein the (B) component crosslinking agent is an aliphatic polyamine.

10. The acrylic rubber composition according to claim 4, wherein the (B) component crosslinking agent is an aliphatic polyamine.

11. The acrylic rubber composition according to claim 5, wherein the (B) component crosslinking agent is an aliphatic polyamine.

12. The acrylic rubber composition according to claim 2, wherein the (B) component crosslinking agent is an aliphatic polyamine carbamate.

13. The acrylic rubber composition according to claim 3, wherein the (B) component crosslinking agent is an aliphatic polyamine carbamate.

14. The acrylic rubber composition according to claim 4, wherein the (B) component crosslinking agent is an aliphatic polyamine carbamate.

15. The acrylic rubber composition according to claim 5, wherein the (B) component crosslinking agent is an aliphatic polyamine carbamate.

16. The acrylic rubber composition according to claim 1, which further comprises a halogen-containing acrylic rubber obtained by subjecting an active halogen-containing monomer to copolymerization.

17. The acrylic rubber composition according to claim 1, wherein the total content of an alkyl acrylate and an alkoxyalkyl acrylate in a monomer mixture for preparing the (A) component acrylic polymer is 50 to 100 weight %.

18. The acrylic rubber composition of claim 1 wherein said acrylic polymer comprises a butyl acrylate/ethyl acrylate/2-methoxyethyl acrylate copolymer having bromo termini at both ends, and wherein said crosslinking agent comprises a polyamine.

19. An acrylic rubber composition which comprises the following two components:

(A) an acrylic polymer having at least one active halogen represented by the general formula (1) at a main chain terminus:

wherein $R^1$ represents a hydrogen atom, and $R^2$ represents a univalent organic group derived from a group bonded to a vinyl group of a main chain-constituting vinyl monomer and X represents chlorine, bromine or iodine; and (B) a crosslinking agent; and further
      a halogen-containing acrylic rubber obtained by subjecting an active halogen-containing monomer to copolymerization;
      wherein the (B) component crosslinking agent reacts with the active halogen of the (A) component acrylic polymer to thereby couple a molecule of the (A) component acrylic polymer to another molecule thereof.

* * * * *